United States Patent
Chu et al.

(10) Patent No.: US 8,072,419 B2
(45) Date of Patent: Dec. 6, 2011

(54) COMPUTER MOUSE HAVING A FRONT SIGHT BUTTON AND METHOD FOR GENERATING LOCAL COORDINATES WITH THE SAME

(75) Inventors: Chi-Chun Chu, Hsinchu (TW); Yung-Shun Chuang, Keelung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 980 days.

(21) Appl. No.: 11/907,647

(22) Filed: Oct. 16, 2007

(65) Prior Publication Data

US 2008/0094360 A1    Apr. 24, 2008

(30) Foreign Application Priority Data

Oct. 20, 2006    (TW) .............................. 95138767 A

(51) Int. Cl.
*G09G 5/00* (2006.01)
*G06F 3/033* (2006.01)
*G06F 17/00* (2006.01)

(52) U.S. Cl. ................ 345/156; 345/157; 463/1; 463/2; 463/37; 463/49

(58) Field of Classification Search ................ 345/156, 345/157, 161, 163; 463/37, 38, 39, 49, 50, 463/52, 1, 2
See application file for complete search history.

(56) References Cited

U.S. PATENT DOCUMENTS

| | | | | |
|---|---|---|---|---|
| 4,494,755 A | * | 1/1985 | Caillouet, Jr. | 463/47 |
| 4,712,181 A | * | 12/1987 | Dahlberg | 89/41.22 |
| 4,882,974 A | * | 11/1989 | Reuter et al. | 89/41.16 |
| 6,878,066 B2 | * | 4/2005 | Leifer et al. | 463/39 |
| 7,803,048 B2 | * | 9/2010 | Tilston et al. | 463/31 |
| 7,833,096 B2 | * | 11/2010 | Sakaguchi et al. | 463/31 |
| 2001/0012801 A1 | * | 8/2001 | Komata | 463/37 |
| 2004/0266528 A1 | * | 12/2004 | Wang | 463/37 |
| 2006/0005447 A1 | * | 1/2006 | Lenner et al. | 42/111 |
| 2006/0287027 A1 | * | 12/2006 | Hardisty et al. | 463/8 |
| 2007/0129152 A1 | * | 6/2007 | Tsai et al. | 463/49 |

* cited by examiner

*Primary Examiner* — Richard Hjerpe
*Assistant Examiner* — Alecia D English
(74) *Attorney, Agent, or Firm* — Bacon & Thomas, PLLC

(57) ABSTRACT

The present invention relates to a computer mouse having a front sight button and the method for generating local coordinates with the same, which comprises a position sensor for generating coordinates in accordance with the movement of the mouse, a front sight button for generating a local shooting signal when being pressed, a serial interface device, of which one end is connected to a personal computer for exchanging data between the mouse and the personal computer, and a processing unit. The processing unit is connected to the position sensor, the front sight button and the serial interface device. Upon receiving a local shooting signal, the processing unit generates a specific area having plural perimeter coordinates corresponding to the current coordinate. The processing unit further transmits the current coordinate, the perimeter coordinates and corresponding key-stroke signals sequentially to the personal computer through the serial interface device.

18 Claims, 3 Drawing Sheets

COMPUTER MOUSE HAVING A FRONT SIGHT BUTTON AND METHOD FOR GENERATING LOCAL COORDINATES WITH THE SAME

BACKGROUND OF THE INVENTION

1. Field of the Invention

The present invention relates to the technology of computer mouse and, more particularly, to a computer mouse having a front sight button and method for generating local coordinates with the same.

2. Description of Related Art

Due to rapid growth in the development of personal computers, not only does the overall processing capabilities increase, the memory capacity also expands tremendously, allowing personal computers to achieve various performance-intensive tasks, such as playing multimedia and executing sophisticated computer games. For that reason, playing games on personal computers has already become prevailing and popular among computer users.

In first-person-shooting games, conventionally certain keys on a keyboard or the right and the left buttons on a mouse are used to carry out movement, aiming and firing. However, when a player uses the conventional method, whereby tapping the button numerous times in order to fire a burst of shots, such firing technique may not be quickly nor consistently carried out due to fatigue after a period of time. Also with the up-tempo game plots and the high-leveled intensity during the combats, players may not be able to control the mouse appropriately and therefore lose their accuracy when aiming at the opponents, which would let opponents easily get away without any damage, resulting in less gratification and enjoyment that a player could gain from playing the game.

In order to allow players to easily aim at a moving target, conventionally a stand-alone firing button is provided on the mouse. For example, when a player presses that firing button, a burst of three straight shots will be fired. However, due to a result of overcrowding area of impact or even shots aligned in a straight line, such technique may not be as effective on moving targets. The player often needs to wobble the mouse horizontally back and forth in order to increase the chances of hits by expanding area of impact, from which the player's wrist is prone to injury. Therefore, it is necessary to come up with an improvement to overcome the above deficiencies in the conventional mice, particularly those designed for game playing.

SUMMARY OF THE INVENTION

One of the objectives of the present invention is to provide a computer mouse having a front sight button that allows players to gain more enjoyment from any first-person-shooting computer game by expanding the area of impact upon firing.

Another objective of the present invention is to provide a computer mouse having a front sight button that reduces the possibility of any wrist injury from playing the game by expanding the area of impact upon firing.

In accordance with one aspect of the present invention, there is provide a computer mouse having a front sight button, which comprises a position sensor for generating coordinates in accordance with the movement of the mouse, a front sight button for generating a local shooting signal when being pressed, a serial interface device, of which one end is connected to a personal computer for exchanging data between the mouse and the personal computer, and a processing unit. The processing unit is connected to the position sensor, the front sight button and the serial interface device respectively. Upon receiving the local shooting signal, the processing unit generates a specific area having plural perimeter coordinates corresponding to the current coordinate outputted by the position sensor. The processing unit further transmits the current coordinate, the perimeter coordinates of the specific area and corresponding key-stroke signals sequentially to the personal computer via the serial interface device.

In accordance with another aspect of the present invention, there is provided a method for generating local coordinates with a computer mouse, in which the mouse comprises a position sensor for generating coordinates in accordance with the movement of the mouse and a front sight button configured to generate a local shooting signal when being pressed. The method comprises: (A) obtaining a current coordinate with the position sensor when a local shooting signal is generated; (B) generating a specific area and plural perimeter coordinates thereof in accordance with the current coordinate outputted by the position sensor; and (C) outputting the current coordinate, the perimeter coordinates of the specified area and corresponding key-stroke signals sequentially to a personal computer.

The objectives, advantages, and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiments of the present invention, and the examples of which are illustrated in the accompanying drawings.

Figure 1:
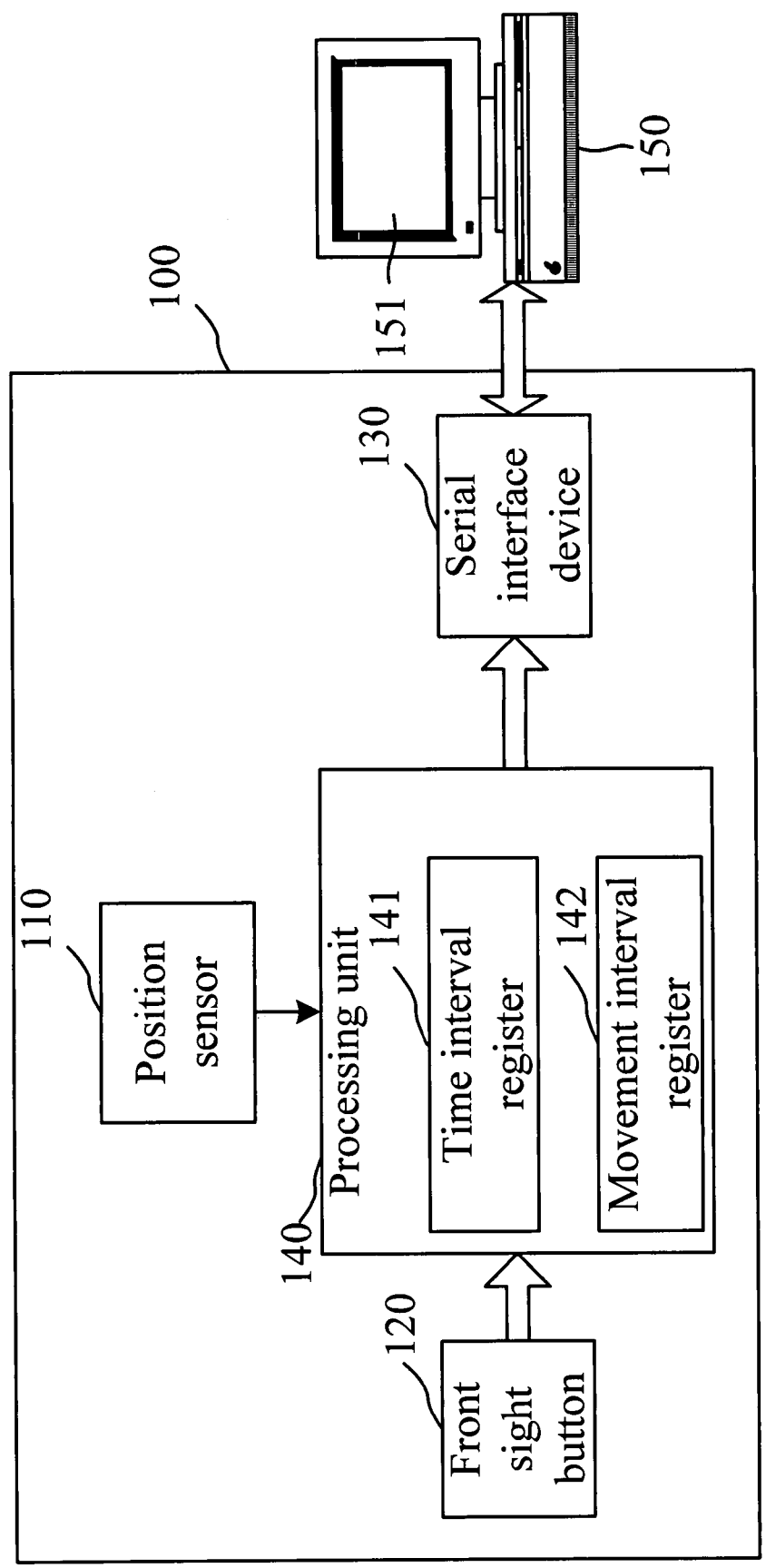
FIG. 1 is a function block diagram illustrating a computer having a front sight button in accordance with the present invention.

FIG. 1 is a functional block diagram showing a computer mouse 100 having a front sight button in accordance with the present invention, which comprises a position sensor 110, a front sight button 120, a serial interface device 130 and a processing unit 140.

The position sensor 110 is configured to generate a current coordinate in accordance with the movement of the mouse 100. The position sensor 110 can be a mechanical position sensor device or an optical position sensor device. When the position sensor 110 is an optical position sensor device, that position sensor is preferably a complementary metal oxide semiconductor (CMOS) position sensor device.

Upon pressing the front sight button 120, a local shooting signal is generated. One end of the serial interface device 130 is connected to a personal computer 150 for exchanging data between the mouse 100 and the personal computer 150. The serial interface device 130 can be an RS232 serial interface device, a PS2 serial interface device or a USB serial interface device.

The processing unit 140 is connected to the position sensor 110, the front sight button 120 and the serial interface device 130 respectively. As the processing unit 140 receives the local shooting signal, a specific area having plural perimeter coordinates is generated in accordance with a current coordinate (x,y) captured by the position sensor. The processing unit 140 then transmits, in sequence, the current coordinate (x,y), the perimeter coordinates of the target area and key-stroke signals corresponding to the current coordinate (x,y) and the perimeter coordinates to the personal computer 150 via the serial interface device 130.

The processing unit 140 further comprises a time interval register 141 and a movement interval register 142. The time interval register 141 pre-stores a time interval, for example, 0.3 second. In such case, the processing unit 140 outputs the current coordinate (x,y), the perimeter coordinates of the specific area and the corresponding key-stroke signals thereto every 0.3 second in accordance with the time interval pre-stored in the time interval register 141.

The movement interval register 142 pre-stores a movement interval, Δn, which has a predetermined value of 10 counts per inch. In such case, the processing unit 140 calculates the perimeter coordinates of the target area in accordance with the movement interval, Δn, pre-stored at the movement interval register 142.

Figure 2:
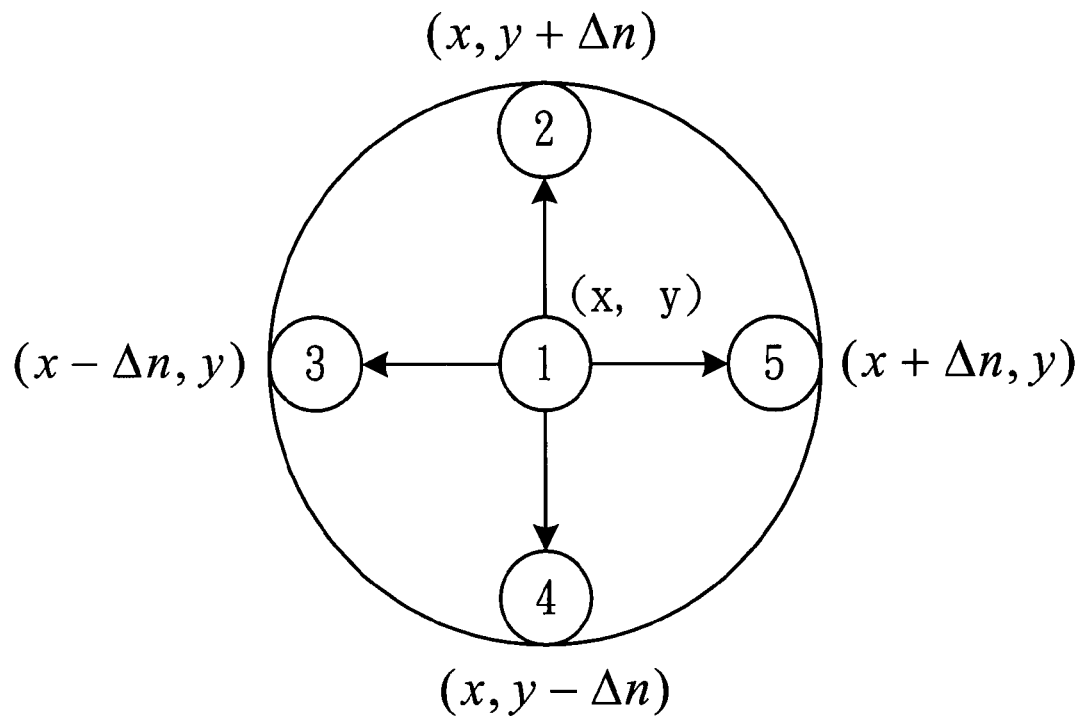
FIG. 2 is a schematic diagram illustrating coordinates of a circular target are in accordance with the present invention.

FIG. 2 is a schematic diagram illustrating a circular specific area in accordance with the present invention. As shown in FIG. 2, the perimeter coordinates of that specific area are (x+Δn,y), (x−Δn,y), (x,y+Δn) and (x,y−Δn) respectively, where (x,y) is the current coordinate generated by the position sensor 110, and Δn is a predetermined movement interval stored in the movement interval register 142.

Figure 3:
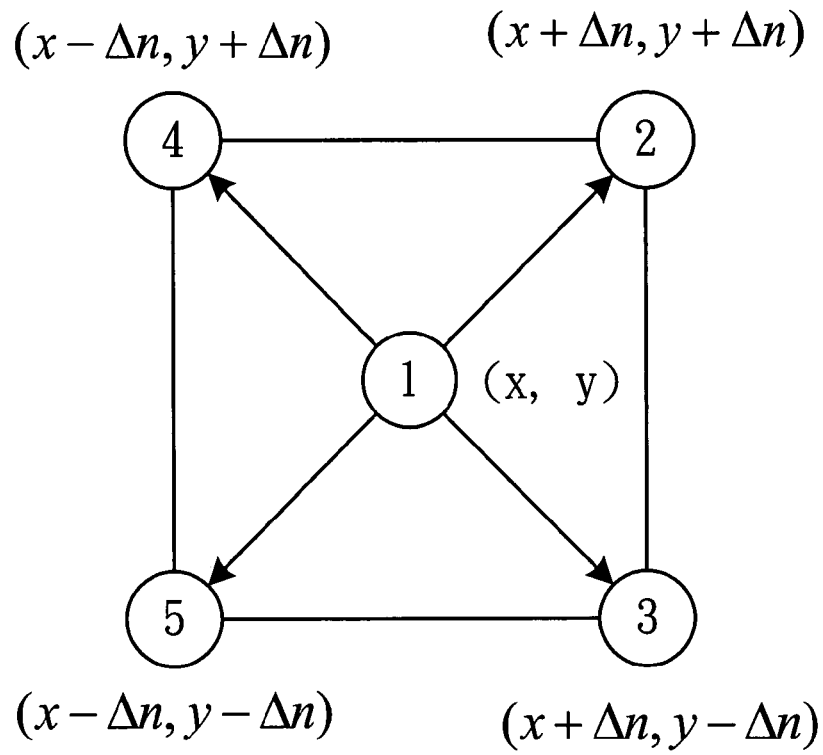
FIG. 3 is a schematic diagram illustrating coordinates of a square target are in accordance with the present invention.

FIG. 3 is a schematic diagram illustrating a square specific area in accordance with the present invention. As shown in FIG. 3, the perimeter coordinates of that specific area are (x+Δn,y+Δn), (x+Δn,y−Δn), (x−Δn,y+Δn) and (x−Δn,y−Δn) respectively, where (x,y) is the current coordinate generated by the position sensor 110, and Δn is a predetermined movement interval stored in the movement interval register 142.

For illustrative purposes, the shape of the specific areas in FIG. 2 and FIG. 3 are circle and square respectively; however, the specific area can be provided in any other shape as desired. In addition, a total of four coordinates are selected for the specific area respectively in FIG. 2 and FIG. 3; however, two, six, eight or any other number of coordinates can be selected in other embodiments.

Upon pressing the front sight button 120, the processing unit 140 obtains a current coordinate (x,y) captured by the position sensor 110 and generates four perimeter coordinates and the corresponding key-stroke signals respectively in accordance with the movement interval, Δn, stored in the movement interval register 142. After which, the processing unit 140 outputs, in sequence, the current coordinate (x,y), the perimeter coordinates of the specific area and the corresponding key-stroke signals thereto to the personal computer 150 every 0.3 second. A 'targeting hot zone' will then be displayed on the screen 151 of the personal computer 150. Taken FIG. 2 for an example, the current coordinate (x,y) is set as the center of the targeting hot zone, where shots will be fired at each of the center, the front, the left, the back and the right once, as to proceed with a so-called a 'shot burst', in which each shot is delayed every 0.3 second from the previous shot, for a total of 5 straight shots to complete a round upon pressing the front sight button 120.

Values stored within either the time interval register 141 or the movement interval register 142 are predetermined. The user may run a program on the personal computer 150 to configure the values stored within the time interval register 141 and the movement interval register 142.

Figure 4:
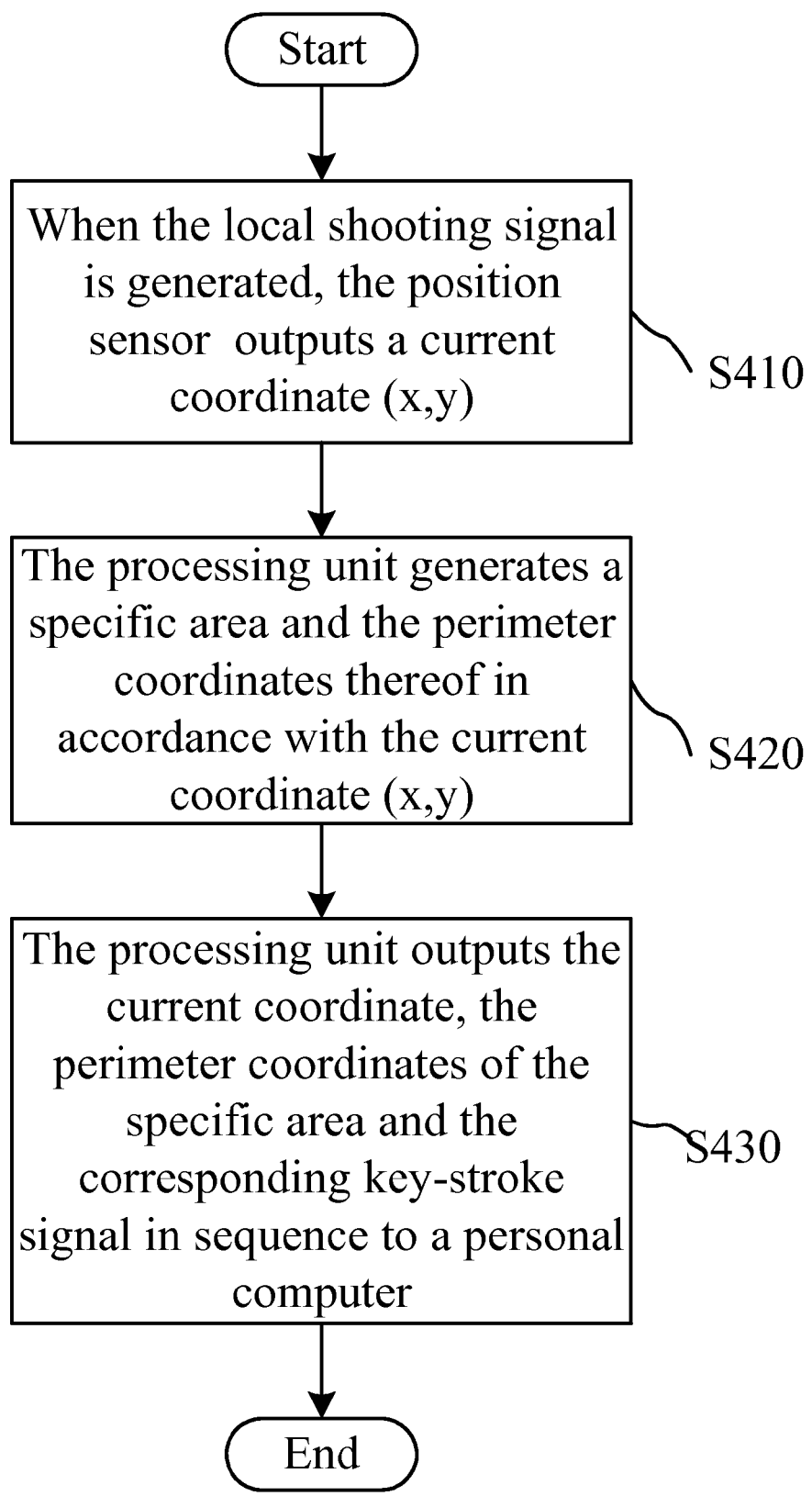
FIG. 4 is a flow chart showing the method for generating local coordinates with a computer mouse in accordance with the present invention.

FIG. 4 is a flow chart illustrating the method for generating local coordinates with a computer mouse 100 in accordance with the present invention. The computer mouse 100 comprises a position sensor 110 and a front sight button 120, whereby the position sensor 110 generates a current coordinate in accordance with the movement of the mouse 100, and a local shooting signal is generated upon pressing the front sight button 120. In Step S410, the processing unit 140 first determines whether a local shooting signal has been generated. Once the local shooting signal is generated, the position sensor 110 then outputs a current coordinate (x,y).

In Step S420, the processing unit 140 then generates a specific area and the perimeter coordinates thereof in accordance with the current coordinate (x,y) outputted by the position sensor 110.

When the specific area is a circle, the perimeter coordinates thereof are (x+Δn,y), (x−Δn,y), (x,y+Δn) and (x,y−Δn) respectively, where (x,y) is the current coordinate generated by the position sensor 110, and Δn is a predetermined movement interval. The predetermined movement interval is measured by how many counts there are per inch.

When the specific area is a square, the perimeter coordinates thereof are (x+Δn,y+Δn), (x+Δn,y−Δn), (x−Δn,y+Δn) and (x−Δn,y−Δn) respectively, where (x,y) is the current coordinate generated by the position sensor 110, and Δn is a predetermined movement interval. The predetermined movement interval is also measured by how many counts there are per inch.

In the following Step S430, the processing unit 140 outputs the current coordinate, the perimeter coordinates of the specific area and the corresponding key-stroke signals thereto in sequence to a personal computer 150 via the serial interface device 130.

In accordance with the present invention, a button providing the function of the front sight button is configured appropriately on a computer mouse or a mouse designed for computer games. The front sight button can be a stand-alone button or can be carried out by pressing the left, the middle and the right button together or in any available combination thereof. The function of the front sight button can be achieved using the firmware of the processing unit 140. It is not required to activate the front sight button by running a driver program, nor by restarting the system or hot-plugging the mouse. Players are able to configure any detailed performance to be provided by the front sight button through programs should such demand is needed.

The present invention allows users to altogether resolve the problems of overcrowding shots or shots aligned in a straight line when firing at opponents in a first-person-shooting game. The present invention enables players to effortlessly aim at any opponent who is in rapid movement and to perform a 'shot burst' of fire five straight shots within the target area, so as to effectively take out opponents by increasing his/her hit average in the game. The present invention is especially suited for beginners, who are able to quickly enhance their game-playing skill levels and easily completing each given task in the game with the help of the present invention.

From the above description, the present invention utilizes a processing unit to generate a specific area and perimeter coordinates of that specific area in which a burst of five straight shots can be fired to increase hits, such that players can enjoy the game much better while reducing the chances of having any wrist injury.

Although the present invention has been explained in relation to its preferred embodiment, it is to be understood that many other possible modifications and variations can be made without departing from the scope of the invention as hereinafter claimed.

What is claimed is:

1. A computer mouse having a front sight button, comprising:
   a position sensor, for generating coordinates in accordance with the movement of the computer mouse;
   a front sight button, configured to generate a local shooting signal when being pressed;
   a serial interface device, of which one end is connected to a personal computer for exchanging data between the computer mouse and the personal computer; and
   a processing unit, connected to the position sensor, the front sight button and the serial interface device respectively, for generating a specific area having a plurality of perimeter coordinates that are calculated based on a movement interval corresponding to the current coordinate outputted by the position sensor and transmitting the current coordinate, the plurality of perimeter coordinates of the specific area and key-stroke signals corresponding to the current coordinate and the plurality of perimeter coordinates sequentially based on a time interval to the personal computer via the serial interface device when receiving the local shooting signal, so as to form a targeting hot zone in which a plurality of shots are fired at each of the current coordinate and the plurality of perimeter coordinates.

2. The computer mouse as claimed in claim 1, wherein the processing unit further comprises:
   a time interval register storing the time interval.

3. The computer mouse as claimed in claim 2, wherein the processing unit further comprises:
   a movement interval register storing the movement interval.

4. The computer mouse as claimed in claim 3, wherein the movement interval stored in the movement interval register is measured by how many counts there are per inch.

5. The computer mouse as claimed in claim 4, wherein the specified area is a circle.

6. The computer mouse as claimed in claim 5, wherein the perimeter coordinates of the specified area are $(x+\Delta n,y)$, $(x-\Delta n,y)$, $(x,y+\Delta n)$ and $(x,y-\Delta n)$ respectively, where $(x,y)$ is the current coordinate generated by the position sensor, and $\Delta n$ is the movement interval stored in the movement interval register.

7. The computer mouse as claimed in claim 4, wherein the specific area is a square.

8. The computer mouse as claimed in claim 7, wherein the perimeter coordinates of the specific area are $(x+\Delta n,y+\Delta n)$, $(x+\Delta n,y-\Delta n)$, $(x-\Delta n,y+\Delta n)$ and $(x-\Delta n,y-\Delta n)$ respectively, where $(x,y)$ is the current coordinate generated by the position sensor, and $\Delta n$ is the movement interval stored in the movement interval register.

9. The computer mouse as claimed in claim 4, wherein the position sensor is a mechanical position sensor device.

10. The computer mouse as claimed in claim 4, wherein the position sensor is an optical position sensor device.

11. The computer mouse as claimed in claim 10, wherein the position sensor is a complementary metal oxide semiconductor position sensor device.

12. A method for generating local coordinates with a computer mouse, which comprises a time interval register storing a time interval, a movement interval register storing a movement interval, a position sensor for generating coordinates in accordance with the movement of the computer mouse, and a front sight button configured to generate a local shooting signal when being pressed, the method comprising the steps of:
    (A) obtaining a current coordinate outputted by the position sensor when the local shooting signal is generated;
    (B) generating a specific area and a plurality of perimeter coordinates that are calculated based on the movement interval corresponding to the current coordinate outputted by the position sensor; and
    (C) outputting the current coordinate, the perimeter coordinates of the specific area and key-stroke signals corresponding to the current coordinate and the perimeter coordinates sequentially to a personal computer based on the time interval, so as to form a targeting hot zone in which a plurality of shots are fired at each of the current coordinate and the plurality of perimeter coordinates.

13. The method as claimed in claim 12, wherein in step (B), the specific area is a circle.

14. The method as claimed in claim 13, wherein the perimeter coordinates of the specific area are $(x+\Delta n,y)$, $(x-\Delta n,y)$, $(x,y+\Delta n)$ and $(x,y-\Delta n)$ respectively, where $(x,y)$ is the current coordinate generated by the position sensor, and $\Delta n$ is the movement interval.

15. The method as claimed in claim 14, wherein the movement interval is measured by how many counts there are per inch.

16. The method as claimed in claim 12, wherein in step (B), the specific area is a square.

17. The method as claimed in claim 16, wherein the perimeter coordinates of the specific area are $(x+\Delta n,y+\Delta n)$, $(x+\Delta n,y-\Delta n)$, $(x-\Delta n,y+\Delta n)$ and $(x-\Delta n,y-\Delta n)$ respectively, where $(x,y)$ is the current coordinate generated by the position sensor, and $\Delta n$ is the movement interval.

18. The method as claimed in claim 17, wherein the movement interval is measured by how many counts there are per inch.

* * * * *